Feb. 10, 1970 M. SOLLIMA ET AL 3,494,695

MICROPHOTOGRAPHIC REPRODUCING SYSTEM

Filed Jan. 15, 1968 2 Sheets-Sheet 1

MARIO SOLLIMA &
GEORGES GUILLOT,
Inventors
by Stephen H. Frishauf
Atty

Feb. 10, 1970 M. SOLLIMA ET AL 3,494,695

MICROPHOTOGRAPHIC REPRODUCING SYSTEM

Filed Jan. 15, 1968

2 Sheets-Sheet 2

3,494,695

MICROPHOTOGRAPHIC REPRODUCING SYSTEM

Mario Sollima, Colombes, and Georges Guillot, Vitry sur Seine, France, assignors to Compagnie Francaise Thomson Houston-Hotchkiss Brandt, Paris, France, a corporation of France Filed Jan. 15, 1968, Ser. No. 697,899
Claims priority, application France, Jan. 25, 1967, 92,388
Int. Cl. G03b 27/52
U.S. Cl. 355—41 10 Claims

ABSTRACT OF THE DISCLOSURE

An object pattern (3) such as a microcircuit which is to be photographically reproduced to a reduced scale as a two-dimensional array of identical patterns on a photoplate (15) is supported at a fixed adjustable location on guiderails (5). The plate (15) is supported on a carrier (9) mounted for two-dimensional universal planar movement on a bass-plate (8) by way of anti-friction bearings (10) and is shiftable with micrometer screws (11, 12). Photocells mounted in the plane of the object (3) cooperate with optical monitor line gratings mounted on the shiftable carrier (9) to trigger the flasher (4) for exposing the plate (15) to the object (3) at accurately determined positions of the carrier (9) in its shifting movements, FIG. 1.

This invention relates to systems for photographically reproducing a selected object pattern on a photographic plate in order to produce on the plate a two-dimensional array of identical patterns, each similar to the object pattern but at a considerably reduced scale, and at accurately determined spacings across the two dimensions of the array.

Reproducing systems of this type have assumed great importance in the manufacture of etching masks used in the series production of microminiature integrated electronic circuits. This technology involves multiple etching steps performed on semi-conductor stock which is then cut up into minute identical wafers. Each etching step requires the use of a particular mask and it is essential that the various masks used in the successive etching steps of a given circuit fabricating process should be strictly registerable.

Reproducing microphotographic benches used heretofore have generally comprised a crossed-slide mechanism with micrometer screws, very similar to the crossed-slide and leadscrew mechanisms used in many machine-tools, for shifting the photographic plate relative to the object pattern along two dimensions on a plane normal to the camera optical axis. An apertured, revolving indexing disc cooperating with photocells was generally used for triggering the photographic flash at each desired position of the plate in its two-dimensional traverse.

In order to obtain the desired precision, about 1 micron, with a system of that type the machining tolerances on the various slide guideways and the pitch of the leadscrews must be to the order of a fraction of one micron. While such extreme tolerances can be achieved at the cost of much initial time and expense, it is practically impossible to maintain them for any considerable period of time. The inevitable wear on the leadscrew thread surfaces, especially, has limited the useful service life of conventional reproducing benches and has greatly increased the manufacturing costs of etching masks and of the microelectronics produced therewith.

Objects of this invention are to provide a completely new design of reproducing microphotographic benches in which the extreme precision desired can be achieved much more easily and can be maintained for much longer periods than heretofore.

Subject matter of the invention: a single transversely-shiftable carrier plate is mounted for two-dimensional universal planar movement on a baseplate by way of antifriction bearings or the like. Optical monitor line gratings mounted on the shiftable carrier cooperate with photocells for triggering the flasher to expose the plate to the object at accurately determined positions of the shiftable carrier.

As will be understood from the ensuing disclosure, the relative precision of the reproduced pattern obtained with such a system is entirely independent from the dimensional tolerances of the mechanical parts, and particularly is not impaired by wear on leadscrew thread surfaces, even though screws are used for shifting the carrier. The precision is determined essentially by the precision of the optical monitor line gratings, which can be made as high as desired and will not deteriorate with time.

An exemplary embodiment of the invention will now be described with reference to the accompanying drawings, wherein.

Figure 1:
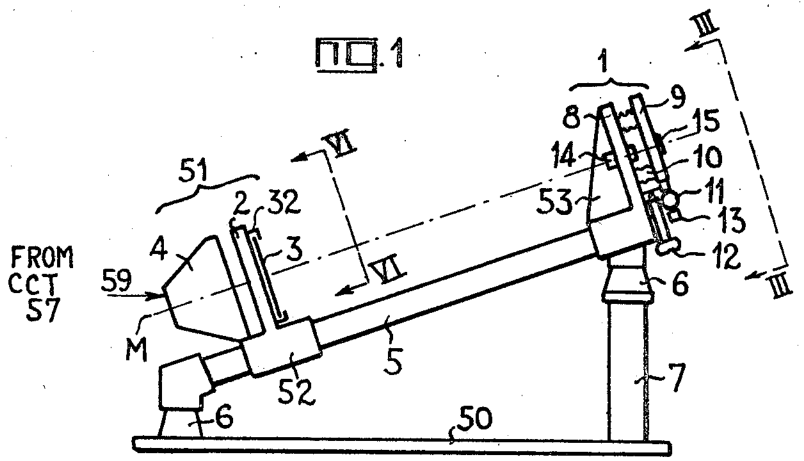
FIG. 1 is a simplified general view of the improved microphotographic duplicating system in side elevation.

The system shown in FIG. 1 comprises a stable stand having a base 50 with a pair of upright legs 7 at one end. A pair of transversely spaced parallel guide rails 5 (only one apparent) is mounted on the base and legs 7 through shock-proof mounts 6, at an inclination of e.g. 30° to the horizontal.

Mounted in longitudinally fixed position at the upper end of the guide rails 5 is a camera unit 1 while lower down on guiderails 5 an object unit 51 is mounted for slidable adjustment towards and away from unit 1. Object unit 51 includes two guide sleeves 52 slidable on rails 5 and a single one of which can be blocked on its rail through blocking means not shown, and an upstanding apertured plate 2 supporting a frame 32 (also see FIG. 6) in which an object 3 in the form of a transparency with an opaque pattern to be reproduced, is adapted to be replaceably mounted. Unit 51 further includes a casing 4 containing a light source, specifically a flashing lamp, which is triggerable to illuminate the object pattern 3.

Camera unit 1 comprises a fixed frame 53 fixedly mounted on the upper ends of rails 5 and an upstanding base-plate 8. Further, a shiftable carrier plate 9 is supported from the upper (or outer) side of baseplate 8 for limited parallel displacements relative to it in all directions of a plane normal to the guiderails 5.

Figure 3:
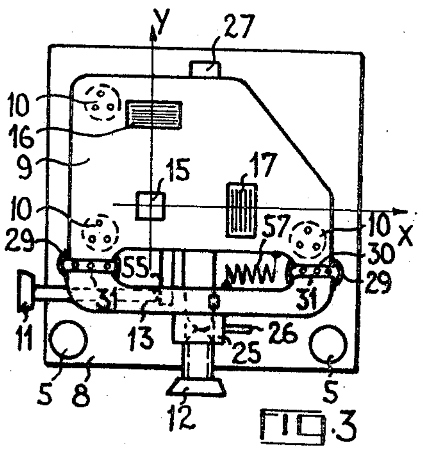
FIG. 3 is a larger-scale view on line III—III of FIG. 1.
Figure 4:
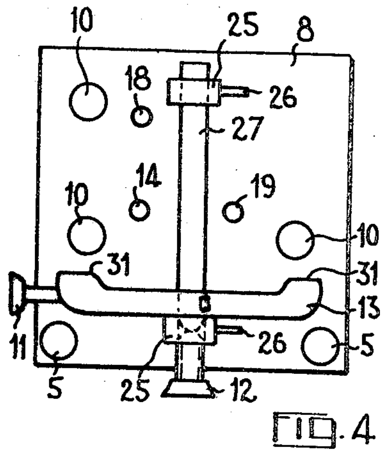
FIG. 4 is similar to FIG. 3 but with the movable carrier 9 removed.
Figure 5:
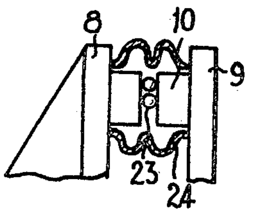
FIG. 5 is a larger-scale view of a bearing in FIG. 3.

For this purpose, see FIGS. 3 and 5, each of plates 8 and 9 has three spaced coplanar bearing surfaces 10 in cooperating relation as between the two plates, with a set of balls 23 enclosed between the cooperating surfaces 10 of each of the three pairs. Flexible pleated boots 24 seal the ball bearings against the entry of dirt. With this arrangement the shiftable carrier 9 can be frictionlessly displaced in all directions relative to plate 8 on a plane parallel to both plates 8 and 9.

Carrier 9 has a square opening in which a photosensitive plate 15 is fixedly, replaceably supported through any suitable means not shown. Carrier 9 has two further openings in which are fixedly mounted two so-called optical monitor line-gratings, including X-grating 17 and Y-grating 16. Each grating may be a glass plate on which is formed a very precise set of thin parallel opaque lines at prescribed pitch spacings, and as shown in Y-grating 16 the lines are normal to a Y axis while in X-grating 17 the lines are normal to an X-axis, both of which axes intersect at the center of plate 15.

Figure 2:
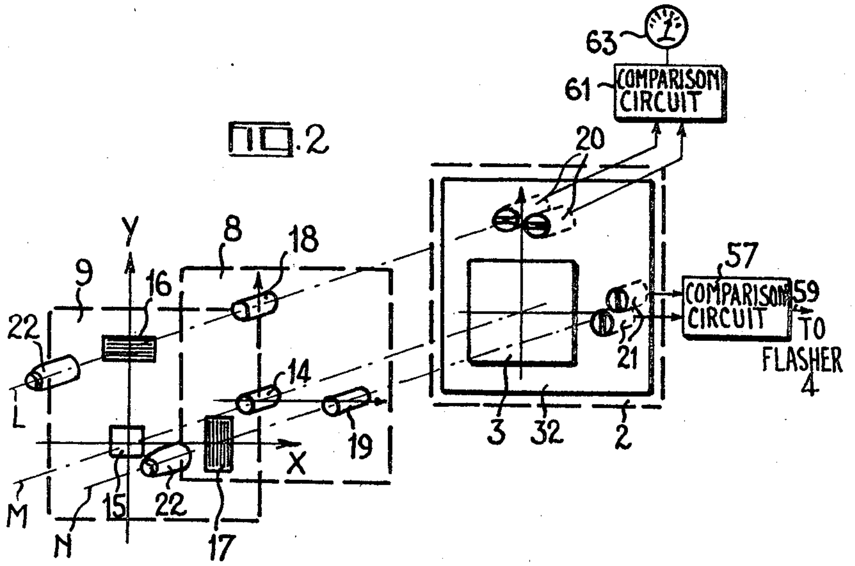
FIG. 2 is a schematic perspective view illustrating the positional relationship between various optical components, and also showing electronic circuitry in block form.

As schematically shown in FIG. 2, the optical system of the apparatus involves three parallel optical axes M, N and L. Axis M is associated with photographic plate 15, axis N with X-grating 17 and axis L with Y-grating 16. Also positioned on the M axis is a camera lens 14 supported in baseplate 8 through means not shown; and positioned on the N and L axes are the respective projector lenses 19 and 18 also supported in baseplate 8. Lenses 14, 18 and 19 have the same focal length. Further, mounted in alignment with the N and L axes are light sources 22 for illuminating the gratings 17 and 16 by transparency. The mounting means for sources 22, not shown for clarity, may comprise a common rigid arm upstanding from baseplate 8 and freely extending through an aperture in carrier 9.

In unit 51, object carrier frame 32 supports two pairs of photomultiplier cells 21 and 20, positioned to either side of the N and L axes respectively, for cooperation through projectors 19 and 18 with X- and Y-gratings 17 and 16. Object pattern 3 has its center on the M-axis for cooperation through camera lens 14 with photo-plate 15.

Baseplate 8 carries bearings 25 aligned in the Y direction and slidable in these bearings is a shaft 27 having a crossarm 13 rigidly secured to it near its lower end. Crossarm 13 is formed at its ends with coplanar flat bearing surfaces 31. Carrier 9 is formed with cooperating coplanar bearing surfaces 30 which rest on the surfaces 31 through needle bearings enclosed in flexible dust seals 29. A first micrometer lead screw 11 (X-screw) engages a longitudinal tapping formed in one end of arm 13 and its tip engages one side of a stop 55 depending from carrier 9. A light tension spring 57 attached to arm 13 and carrier 9 urges carrier 9 leftward to engage stop 55 against screw 11. This arrangement provides for the contolled displacement of carrier 9 in the X direction.

A second micrometer leadscrew 12 (Y-screw) engages a tapping formed e.g. in a lower part of lower bearing 25 and engages the lower end of shaft 27. Gravity which may be aided, or partly cancelled (as circumstance may demand), by spring means not shown, urges carrier 9 against crossarm 13 by way of bearing surfaces 30–31, and also urges the entire movable assembly comprising carrier 9, crossarm 13 and shaft 27 into engagement, with Y-screw 12. This arrangement provides for the controlled displacement of carrier 9 in the Y-direction relative to baseplate 8. The movable assembly can be blocked at a selected position in the Y-direction by suitable blocking means 26 associated with bearings 25, e.g. pressure-air actuators coupled for ganged action.

In operation, an object pattern 3 is inserted into frame 32. Object pattern 3 may be formed photographically or otherwise upon a transparent plate. The purpose of the system is to reproduce this object pattern at a greatly reduced scale, e.g. 1:100, upon photo-plate 15 as a two-dimensional array of identical reproduced patterns at precisely distributed locations along the X and Y axes of the plate.

Figure 7:
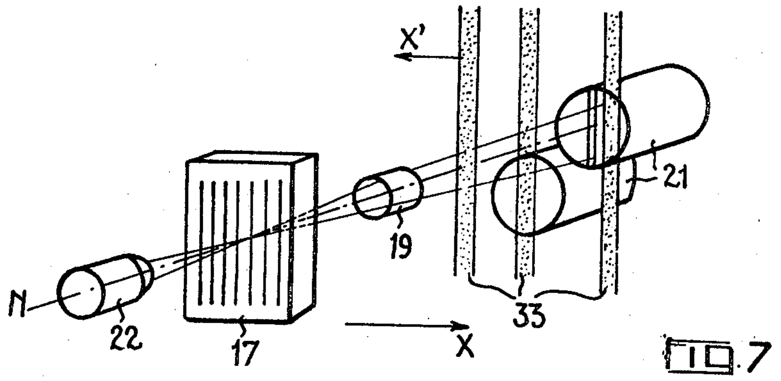
FIG. 7 is an optical system diagram in perspective.

For this purpose, the X-screw 11 is rotated, preferably by an electric motor not shown, to impart a slow displacement to carrier 9 in a selected direction (right or left) along the X axis relative to baseplate 8. As shown in FIG. 7 the lines of X-grating 17 illuminated from source 22 and projected through lens 19 form enlarged (×100) image lines 33 in the plane of photo-cells 21. As X-grating 17 moves with carrier 9 in the direction of arrow X, the image lines 33 are moved in the reverse direction indicated by arrow X′ past photocells 21. Each photocell has a fine receiving slit parallel to the lines of the X-grating 17, and each photocell therefore receives minimum illumination at the instant its slit is being traversed by a dark grating-image line 33. The outputs from photo-cells 21 are applied to a conventional balanced comparison circuit 57 capable of generating an output signal on line 59 at the instant a predetermined relation is present between the illuminations received by both cells 21. The signal at 59 is applied to flasher 4 to produce a brief flash of intense light which will illuminate the object pattern 3, so that camera 14 forms a reduced picture of pattern 3 on the particular area of plate 15 that intersects the optical axis M at that instant. As rotation of X-screw 11 is continued, movement of carrier 9 proceeds uniformly and identical reduced images of object pattern 3 are thus reproduced sequentially at incrementally displaced positions along the X axis.

As carrier 9 reaches a prescribed end position along the X-axis, means are provided for arresting its movement and returning it at high speed to its initial position. Conventional means (not shown) may be used for this purpose such as a reversing switch actuated by a stop on carrier 9 and acting to connect the field of the motor driving screw 11 in reverse across an increased voltage supply.

With carrier 9 back at its starting position an increment of motion is now imparted to it along the Y axis. For this purpose Y-screw 12 is rotated manually or automatically to raise the assembly including shaft 27, crossarm 13 and carrier 9. In this movement Y-grating 16 cooperates with photocells 20 in the same way as described in connection with FIG. 7 for the X axis. The outputs from photocells 20 are applied to a comparison circuit 61 which causes a sensitive dial instrument 63 to indicate zero at the instant a prescribed relation is present between the illuminations of both photocells 20. After this zero adjustment actuators 26 are operated to block the movable assembly in bearings 25. The X-motor is then started again to rotate X-screw 11 and move carrier 9 along the X-axis; during this movement circuit 57 will act intermittently to trigger flasher 4 and take another series of pictures of pattern 3 at the prescribed incrementally spaced positions along the X axis as earlier described, after which carrier 9 is again returned at high speed to its intial position, then Y-screw 12 is again rotated to displace carrier 9 a further incremental step in the Y direction, and so on until the full complement of pictures has been obtained. The resulting pattern produced on plate 15 will be a rectangular matrix-like array of minute opaque patterns all alike and each identical, though at the reduced scale of 1:100, to the object pattern 3 and suitable for use as an etching mask for microelectronics.

A particularly convenient method of operating the photoelectric monitoring system is the following. Comparison circuit 57 or 61 is adjusted to deliver a signal on its output line at the instant where one of the photocells of the related pair is receiving twice as much illumination as the other, that is, at the instant one of the two photocells is fully illuminated whereas the illumination of the other is passing from a maximum to a minimum. The precision obtainable in this way in the displacements in the X or Y direction has been found to be better than 0.1 μ or 1000 angstrom units.

Figure 6:
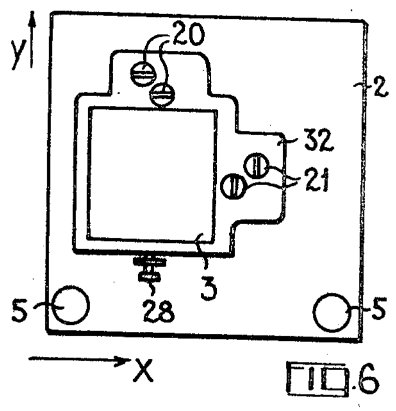
FIG. 6 is a view on line VI—VI of FIG. 1.

As shown in FIG. 6, means such as a micrometer screw 28 are provided for readjusting the object frame 32 in the Y direction. This is useful because the operation of blocking actuators 26 may sometimes cause a very slight misadjustment of carrier 9 in the Y direction. Adjusting the screw 28 will in such case cause slight displacement of the object 3 together with the Y-photocells 20 relative to the Y-photocells 20 relative to the Y-gating image lines. Clearly the concurrent displacement of the X-photocells 21 will not disturb the X-axis adjustment since said displacement occurs parallel to lines of the X-grating.

It will be observed that the three mounting plates 9, 8 and 2 support respective triplets of optical components in rigidly fixed undeformable triangular configurations which are geometrically congruent and can be initially constructed with great accuracy to provide three optical axes, L, M, N which shall be precisely rectilinear and parallel. Such initial parallelism will be preserved throughout subsequent service even in the presence of disturbing factors, primarily thermal in character, especially if the three plates 9, 8 and 2 are made from a common metal so that their deformations shall not affect the linearity and mutual parallelism of the three optical axes.

However, the fundamental reasons for the great superiority of the system of the invention over conventional reproducing microphotographic benches, as demonstrated by extensive testing, are the following.

The provision of a single carrier 9 resting at three spaced bearing areas 10 on a fixed baseplate so as to be freely movable with two degrees of freedom thereover eliminates all of the guideway tolerances and cumulative sources of error that are present in the conventional crossed-slide system.

Moreover, the relative accuracy obtained in the reproduced pattern formed on plate 15 is entirely independent from the precision in the movements of the screws 11 and 12, but is determined solely by the precision of the optical monitoring line-gratings. The wear inevitably introduced into the screw thread surfaces with time will have no repercussions on the relative precision of the reproducing pattern obtained, whereas the wear sustained by the lead-screw thread surfaces in the prior-art crossed-slide systems directly affected such precision. In the system of the invention, the relative precision of the patterns, is, as just stated, determined solely by the accuracy of the X- and Y-gratings used, and this can be made extraordinarily high and will not deteriorate over indefinitely long periods of time. While it is true that in the system of the invention unequal wear on the screw thread surfaces may introduce small amounts of distortion as between different portions of a common reproducing pattern, such distortion will affect the patterns of different masks produced sequentially by the apparatus in exactly the same way, so that such masks will remain strictly registerable with one another, which is the important point in the technology to which this invention is directed.

Since the precision of the system is primarily determined by that of the optical monitor gratings, these will have to be selected with great care. High-quality gratings of the precision here required are at the present time extremely expensive. However, such gratings for use in the systems of the invention as well as for other purposes can be produced very easily and at a small fraction of their current cost by means of apparatus according to the invention, by using a single illuminated slit as the object pattern 3, with a pair of good conventional gratings 17 and 16 to start with.

Among the many modifications lying within the scope of the invention, the following may be mentioned. The single camera lens 14 may be replaced (e.g. interchangeable) with a rigid cluster of e.g. four lenses for simultaneously forming four pictures on plate 15.

What we claim is:

1. Microphotographic reproducing apparatus comprising:
  a base (50, 5, 6, 7); a first carrier (51) and a second carrier (9) mounted on said base in aligned and spaced relation along an optical axis (M); one (9) of said carriers being transversely shiftable with respect to the other in a direction (X) normal to said axis (M);
  means for supporting an object pattern (3) on said first carrier (51);
  means for supporting a photosensitive surface (15) on which said pattern is to be repeatedly photographed, on said second carrier (9);
  camera means (14) forming a reduced image of said object pattern (3) on said photosensitive surface (15);
  flash exposing means (4) triggerable to expose said surface (15) to said object pattern (3) through said camera means (14);
  means (11) operable for shifting said shiftable one carrier (9) in said prescribed direction (X);
  a monitor grating (17) comprising an array of spaced lines generally normal both to said axis (M) and said direction (X), associated with said second carrier (9);
  photoelectric pickup means (21);
  means (19) for projecting enlarged images (33) of said grating lines on the plane of said pickup means (21), said photoelectric pickup means being optically responsive to registration of a grating line with said pickup means;
  and means (57, 59) controlled by and connected to said photoelectric pickup means (21) and connected for triggering said exposing means (4) upon detection of registration of a grating line with said pickup means to repeatedly photograph a linear array of identical reduced images of said object pattern (3) at incrementally displaced positions along said direction (X) on said photosensitive surface (15), as said shiftable one carrier (9) is shifted in said direction (X).

2. The apparatus claimed in claim 1, wherein said shiftable carrier (9) is shiftable transversely in a second direction (Y) normal to said optical axis (M) and different from said first direction (X); including:
  further means (12) operable for shifting said one carrier (9) in said further direction (Y);
  a further monitor grating (16) comprising an array of spaced lines normal both to said axis (M) and to said further direction (Y) associated with said second carrier (9);
  further photoelectric pickup means (20) and means (18) for projecting enlarged images of said further grating lines on the plane of said further pickup means (20), said further photoelectric pickup means being optically responsive to registration of a further grating line with said further pickup means; and
  means (61, 63) connected to said further pickup means (20) and responsive to detection of said registration and controlling the displacements along said further direction (Y) to control the position of said linear array of identical reduced images, at incrementally displaced positions along said further direction (Y), whereby to form a two-dimensional array of said identical reduced images at incrementally displaced positions along both said directions (X, Y) on the photosensitive surface.

3. The apparatus claimed in claim 2, wherein said one, shiftable, carrier (9) constitutes said second carrier on which said photosensitive surface (15) is supported.

4. The apparatus claimed in claim 1, wherein said base comprises rectilinear guiderail means (5); further including means (53, 8) mounting said transversely shiftable carrier (9) in a fixed longitudinal position adjacent one end of said guiderail means (5), and means (52) mounting said other carrier (51) in a longitudinally adjustable position on said guiderail means (5).

5. Microphotographic reproducing apparatus comprising:
  a base including rectilinear guiderail means (5) supported at an angle to the horizontal plane and generally parallel to an optical axis (M) of the apparatus;
  a first carrier (51) and means (52) mounting same in a longitudinally adjustable position on the guiderail means (5):
  a second carrier assembly (1) and means (53) mounting same in a longitudinally fixed position adjacent the upper end of said guiderail means (5), said second carrier assembly (1) comprising:

a baseplate (8) having coplanar spaced bearing surfaces (10) on a plane normal to said optical axis;

a shiftable second carrier (9) having cooperating bearing surfaces respectively engageable with said baseplate bearing surfaces (10) so as to support the second carrier (9) for two-dimensional universal movement relative to the baseplate (8) on said normal plane;

a support (27–13) mounted on said baseplate (8) for limited displacement in a first direction (Y) parallel to said normal plane and perpendicular to the horizontal thereof, and means (12) for effecting such displacement;

said support (27–13) having a pair of coplanar horizontally spaced bearing surfaces (31);

said shiftable second carrier (9) having cooperating bearing surfaces (30) engageable with said support bearing surfaces (31) to permit displacement of said shiftable second carrier (9) in a horizontal second direction (X) relative to said support (27–13) and baseplate (8), and means (11) for effecting such displacement;

an object pattern (3) supported on one (51) of said first and second carriers;

a photosensitive surface (15) supported on the other (9) of said carriers;

camera means (14) forming a reduced image of the object pattern (3) on said photosensitive surface (15);

exposing means (4) triggerable to expose said photosensitive surface (15) to said object pattern (3) through said camera means (14);

means (16, 17, 18, 19, 20, 21) monitoring the positions of said second carrier (9) along said first (Y) and second (X) directions; and means (57–58) connecting said monitoring means to said exposing means (4) for triggering said exposure at predetermined ones of said positions.

6. The apparatus claimed in claim 5, including antifriction means interposed between said pairs of cooperating bearing surfaces (10, 30–31).

7. The apparatus claimed in claim 5, wherein said object pattern (3) is supported on said first carrier (51) and said photosensitive surface (15) is supported on said second, transversely shiftable carrier (9).

8. The apparatus claimed in claim 5, wherein said monitoring means comprise a pair of optical monitor gratings (17, 16) mounted on one (9) of said carriers (51, 9) and having arrays of spaced lines respectively parallel to said first (Y) and second directions of displacement of said second carrier (9), and photoelectric pickup means (20, 21) associated with the other one (51) of said carriers and detecting alignment of a line of said gratings therewith.

9. The bench assembly claimed in claim 8, wherein said object pattern (3) and said photoelectric pickup means (20, 21) are supported on said first carrier (51) and said photosensitive surface (15) and monitor gratings (17, 16) are supported on said second, transversely shiftable carrier (9).

10. Apparatus according to claim 1 wherein said photoelectric pickup means (21) is associated with said first carrier.

References Cited

UNITED STATES PATENTS 3,185,026 5/1965 Carlson et al. -------- 355—41

FOREIGN PATENTS 1,415,466 9/1965 France.

NORTON ANSHER, Primary Examiner

R. A. WINTERCORN, Assistant Examiner

U.S. Cl. X.R.

95—12; 350—115, 116, 162; 355—53, 54